April 19, 1960  D. F. LEHMAN  2,933,326
SELF-ALIGNING TRUCK ASSEMBLY
Filed June 17, 1958
*Fig. 1*
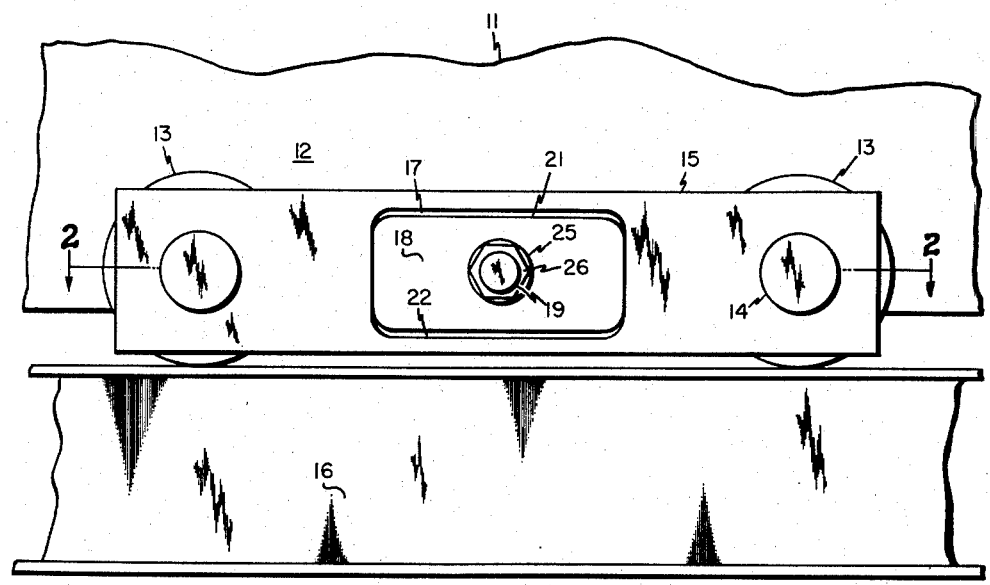
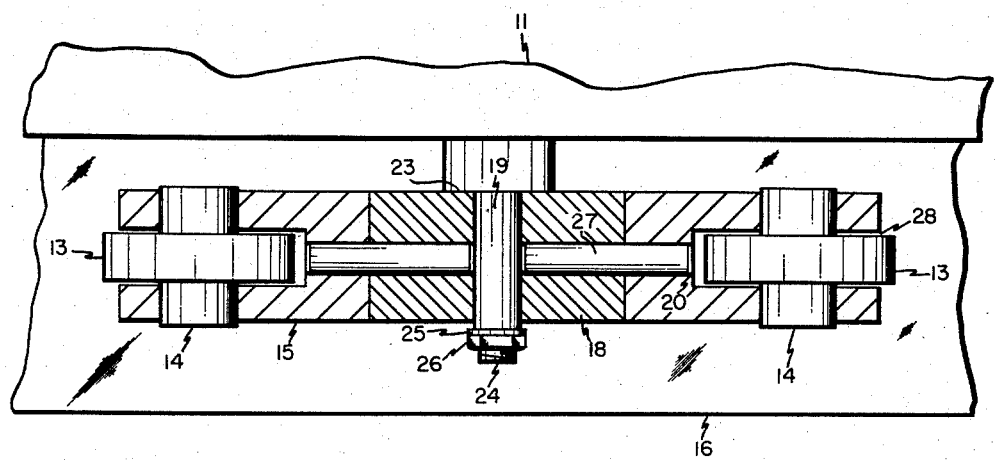
*Fig. 2*
INVENTOR
Don F. Lehman
by Anthony D. Cennamo United States Patent Office 2,933,326
Patented Apr. 19, 1960

2,933,326

SELF-ALIGNING TRUCK ASSEMBLY

Don F. Lehman, Columbus, Ohio, assignor to Industrial Nucleonics Corporation

Application June 17, 1958, Serial No. 742,572

5 Claims. (Cl. 280—47.13)

This invention relates generally to a truck assembly, and more particularly to a truck assembly for supporting a carriage on rails or other surfaces for the purposes of transporting the carriage over a prescribed area.

In connection with many industrial applications and particularly in gauging operations it is necessary that a carriage containing work apparatus or gauging instruments be transported over a predetermined path in relation to the material or work being processed. For this purpose, it is well known to support the apparatus on a carriage which runs on wheels in a guide path or on rails. In general, the carriage will traverse a predetermined path periodically and for this purpose the supporting wheels are generally mounted in a truck arrangement which is pivoted on an axis parallel to the axis of rotation of the wheels on the truck and located at a mid-point between the wheel axes. With this prior art arrangement excessive wear has been caused as a result of the uneven contact between the supporting surface upon which the wheels run and the peripheral surface of the wheels.

It is the principal object of this invention to provide an improved wheel truck for supporting a mobile member.

A further object of this invention is to provide an improved truck assembly pivotally supported on a carriage with the wheels thereof pivoted about a second axis perpendicular to the first pivot axis.

Another object of the present invention is to provide a wheel truck assembly arranged to ride over a surface with the wheels of the truck aligned with the surface upon which they roll.

These and other objects of the present invention will be apparent from the following detailed description taken in conjunction with the accompanying drawing in which:

Fig. 1 is an elevational view of a truck in accordance with the present invention riding on a rail and supporting a carriage;

Fig. 2 is a sectional view taken along the line 22 of Fig. 1.

Referring now to Fig. 1, a carriage 11 or similar device is shown supported on a truck generally designated 12, arranged to support the body 11 in conjunction with one or more similar trucks if desired.

The truck 12 comprises a pair of aligned wheels 13, which may be rotatably mounted on axles 14. The axles in turn are mounted on a block 15 which forms the body of the truck. The truck assembly 12 is adapted to roll upon a track 16 which may be an I-beam or other suitable surface for supporting the carriage 11 movable over a predetermined course by rolling engagement of truck 12 with the track 16.

The block 15 is formed with a central opening 17 which may be generally rectangular in form. Positioned within the opening 17 is a block 18 which is rotatably supported about a horizontal axle 19. The block 18 has dimensions such that it is loosely fitted within the opening 17 and provides between the upper and lower surfaces thereof a clearance 21, 22 with respect to the periphery of opening 17.

Referring now to Fig. 2, further details of the construction of the truck 12 will be described. The truck 12 is secured to the carriage 11 by means of the projecting axle 19, which is formed with a shoulder 23 and a threaded end portion 24. The block 18 is rotatably mounted on the axle 19 and retained in spaced position with respect to the carriage 11 by the shoulder 23. A washer 25 and nut 26 retain the block 18 on the axle 19. The block 18 has horizontal holes therein perpendicular to the axle 19 to receive trunnion pins 27. These pins are secured thereto by press fit or other suitable means.

The block 15 is provided with forked end portions 28 in which the wheels 13 and axles 14 are fitted and rotatably support the block 15. The block 15 may be drilled or reamed to provide holes 20 in alignment with the trunnions 27, whereby the block 15 is pivotally supported on the trunnions 27.

For assemblying the truck 12, the trunnion pins 27 are inserted through the holes 20 for a press fit with the aligned holes in the block 18, whereupon the block 15 will be pivotally supported on the secured trunnions 27. The block 18 is then positioned on the axle 19 and secured by means of the washer 25 and nut 26. The block 15 is placed over the block 18 by positioning the block 18 in the hole 17 with the holes 20 in block 18 for receiving the trunnions 27 aligned with the corresponding holes in the block 15. The wheels 13 are positioned within the forked portions 28 and the axles 14 inserted and secured in any suitable manner to complete the assembly of the truck.

In operation of the truck disclosed by the present invention, the carriage 11 may be required to make numerous traverses on the rail 16 and the truck 12 supports the carriage 11 in rolling contact therewith. As the carriage 11 moves, the truck 12 may pivot about the horizontal axis of the axle 19 to accommodate irregularities in the supporting surface 16 in the direction of travel and by means of the trunnions 27 a limited amount of rotation between the blocks 15 and 18 may occur to maintain the wheels 13 in contact with irregularities in the supporting surface 16 which are transverse to the direction of travel. The rotation around the trunnions 27 may be limited to any desired amount by the relative size of the block 18 and the opening 17 to vary the spacing 21, 22 therebetween.

The disclosed preferred embodiment of the present invention provides a simple and effective rolling support for a carriage member which reduces to a minimum wear caused by uneven surface contact between the rolling wheels and the supporting surface. Various rearrangements of the parts and the relative motion therebetween will be obvious in the light of the present teaching and the invention therefore is not to be limited by the illustrative disclosure, but only by the scope of the appended claims.

What is claimed is:

1. A self-aligning truck comprising a first generally rectangular body member having aligned oppositely directed forked end portions and a central opening therethrough, a wheel and axle rotatably secured in each of said forked end portions, a second body member positioned in said opening, a pair of aligned pivot pins securing said body members together for relative pivotal motion therebetween, and a supporting axle for said truck pivotally secured to said second body member perpendicular to the axis of said pins, the relative dimensions of said second body member and said central opening permitting limited relative rotation of said body members about said pivot pins.

2. A self-aligning truck comprising a first body member having a central opening therethrough and an integral pair of aligned, oppositely directed end portions, a wheel mounted on each of said end portions and each secured thereto for rotation about a corresponding fixed axis relative to said body member, a second body member positioned in said opening, a pair of aligned pivot pins securing said body members together for relative pivotal motion therebetween and a load-bearing axle pivoting said second body member about an axis perpendicular to the common axis of said pivot pins, the relative dimensions of said second body member and said central opening permitting limited relative rotation of said body members about said pivot pins.

3. A self-aligning truck comprising a first body member having a central opening therethrough and an integral pair of aligned, oppositely directed end portions, a second body member positioned in said opening, a pair of aligned pivot pins securing said body members together for relative pivotal motion therebetween, the relative dimensions of said second body member and said opening permitting limited relative rotation of said body members about said pivot pins, a surface-engaging wheel mounted on each of said end portions and each secured thereto for rotation about one of two fixed axes relative to said first body member, and a load-bearing axle pivoting said second body member about a third fixed axis relative to said second body member, said three axes being perpendicular to the axis of said pivot pins.

4. A truck as in claim 3 wherein said axes for said wheels are mutually parallel.

5. A self-aligning truck comprising a first body member having a central opening therethrough and a pair of aligned, oppositely directed forked end portions, a wheel and axle rotatably secured in each of said forked end portions, a second body member positioned in said opening, a pair of aligned pivot pins securing said body members together for relative pivotal motion therebetween, and a supporting axle for said truck pivotally secured to said second body member perpendicular to the axis of said pins, the relative dimensions of said second body member and said central opening permitting limited relative rotation of said body members about said pivot pins.

References Cited in the file of this patent

UNITED STATES PATENTS

| | | |
|---|---|---|
| 1,770,583 | Reid | July 15, 1930 |
| 2,206,359 | Larison | July 2, 1940 |
| 2,336,814 | Suter | Dec. 14, 1943 |
| 2,442,354 | Gordon | June 1, 1948 |
| 2,575,065 | Merry | Nov. 13, 1951 |
| 2,704,215 | Barnard | Mar. 15, 1955 |
| 2,713,179 | Clifton | July 19, 1955 |
| 2,775,466 | Meewes | Dec. 25, 1956 |
| 2,848,245 | Georgi | Aug. 19, 1958 |